March 1, 1960  A. J. C. HALL ET AL  2,927,042
PRODUCING SCALES, PATTERNS AND THE LIKE IN GLASS
Filed Feb. 16, 1956  2 Sheets-Sheet 1

Fig. 1.

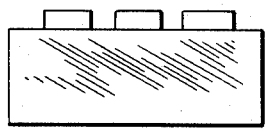

GLASS WITH METALLIC PATTERN ON THE SURFACE

Fig. 2.

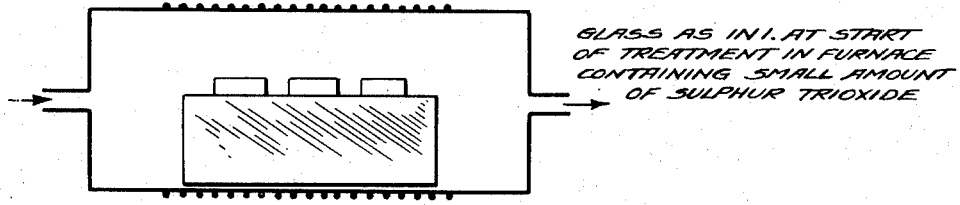

GLASS AS IN 1. AT START OF TREATMENT IN FURNACE CONTAINING SMALL AMOUNT OF SULPHUR TRIOXIDE

Fig. 3.

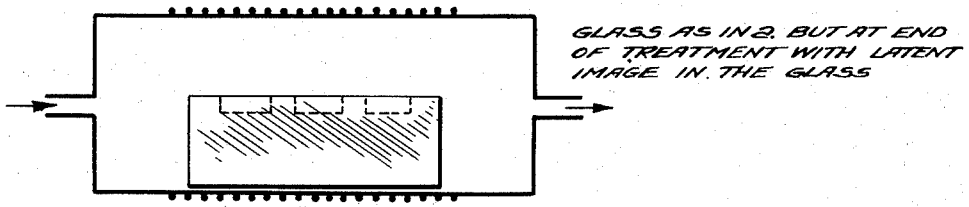

GLASS AS IN 2. BUT AT END OF TREATMENT WITH LATENT IMAGE IN THE GLASS

Fig. 4.

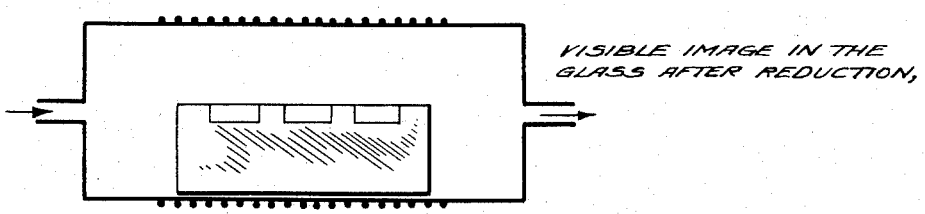

VISIBLE IMAGE IN THE GLASS AFTER REDUCTION,

INVENTORS
JOHN CHARLES HALL,
JAMES GODFREY HAYES,

BY Pierce, Scheffler & Parker
ATTORNEYS

March 1, 1960      A. J. C. HALL ET AL      2,927,042
PRODUCING SCALES, PATTERNS AND THE LIKE IN GLASS
Filed Feb. 16, 1956      2 Sheets-Sheet 2

*Fig. 5.*

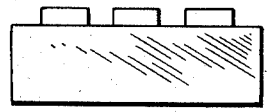

GLASS WITH METALLIC PATTERN ON THE SURFACE

*Fig. 6.*

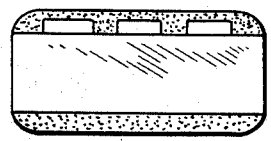

GLASS AS IN 5. AFTER COATING BOTH SIDES WITH GRAPHITE

*Fig. 7.*

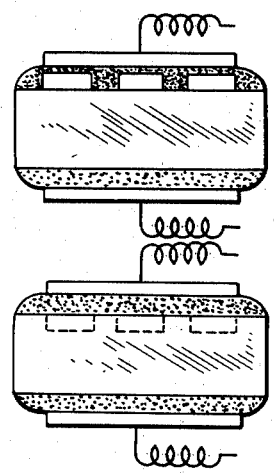

GLASS AS IN 6. AT START OF ELECTROLYSIS: ELECTRODES ON GRAPHITE AND PATTERN ON GLASS SURFACE: ASSEMBLY HEATED IN OVEN OR ON HOTPLATE

*Fig. 8.*

GLASS AS IN 7. AT END OF ELECTROLYSIS. THE LATENT IMAGE IS NOW IN THE GLASS

*Fig. 9.*

LATENT IMAGE IN GLASS AFTER REMOVAL OF GRAPHITE AND BEFORE REDUCTION.

*Fig. 10.*

VISIBLE IMAGE IN THE GLASS AFTER REDUCTION

INVENTORS
JOHN CHARLES HALL,
JAMES GODFREY HAYES,

BY *Pierce, Scheffler & Parker*

ATTORNEYS

United States Patent Office 2,927,042
Patented Mar. 1, 1960

2,927,042

PRODUCING SCALES, PATTERNS AND THE LIKE IN GLASS

Arthur John Charles Hall, Bentleigh, Victoria, and James Godfrey Hayes, Hawthorn, Victoria, Australia, assignors to Commonwealth of Australia, Crown Solicitor's Office, Canberra, New South Wales, Australia Application February 16, 1956, Serial No. 565,789

Claims priority, application Australia February 25, 1955

11 Claims. (Cl. 117—38)

This invention relates to an improved method of producing scales, patterns and the like and refers more particularly to the production of scales, patterns, graticules and other markings in glass for optical instruments and for other purposes.

Graticules, scales and other patterns or markings on or in glass, are used for a variety of applications in the fields of science and industry and for the armed services, and several methods of making them have been established, as follows:

A. A layer of material resistant to an etching fluid such as hydrofluoric acid is deposited on the glass, the desired pattern is formed in the resistant material by mechanical ruling, etching fluid is applied to etch the glass exposed by such ruling and then the etched pattern is filled with a suitable filling material. Alternatively the pattern may be formed in a suitable resist by the use of materials such as photo-engraver's glue, before the glass is etched and then filled.

B. The pattern may be deposited on the glass by physical and/or chemical methods as for example by evaporation of a metal onto the glass through a suitable mask or by using photo-sensitive glue and ferric nitrate solution to form the pattern in a metal that has already been deposited on the glass or by colouring the pattern formed in photo-sensitive glue on the glass.

C. The pattern may be formed by conventional photographic means in the emulsion of photographic plate or film and the plate or film then cut to the desired shape or the emulsion stripped off and redeposited on a glass disc.

D. Lines may be ruled directly into glass as with a diamond tool or through a layer of opaque material deposited on glass.

In general the most satisfactory graticules have been those made by method (A) above, such graticules being less liable to damage and deterioration than the other types which are readily damaged by moisture, abrasion or fungi unless protected by a cover slip which is often undesirable. Graticules made by ruling directly into glass with a diamond tool have limited usefulness because only extremely thin lines can be made in this way and they are not generally useful. Graticules of type (A) are not ideal in that portions of the filling in the lines can and do come out of the lines and make it necessary for the graticules to be refilled; this is of course a disadvantage. Other methods of making graticules are known but are of minor importance. Existing methods of making graticules of type (A) are not suited to mass production requirements in that they are slow, tedious, costly and require elaborate precautions to be taken in order to achieve any appreciable measure of success. This is particularly so when the pattern is complicated and contains figures as most graticules do.

It is an object of this invention to provide a method of producing scales, patterns and the like in glass which is particularly useful for the manufacture of graticules in that it overcomes the above disadvantages, and which is also useful for other purposes such as the marking and graduating of glass articles such as thermometer stems, burettes and syringe barrels.

A method of producing scales, patterns and the like according to the invention broadly comprises forming the scale, pattern or the like in metal or metallic compound on the surface of the glass, and by suitable means causing the final scale, pattern or the like to be formed within the glass.

More particularly a method according to the invention may comprise forming the scale, pattern or the like in metal or metallic compound on the surface of the glass, exposing the glass to oxidizing conditions such as will form a latent image of the scale, pattern or the like within the glass, and thereafter exposing the latent image to conditions such as will develop the scale, pattern or the like in a visible state within the glass. Silver has been found to be the most suitable metal for carrying out the invention. Copper also is very satisfactory and it appears that other metals such as gold, for example, may be useful. As well as the metals themselves, metallic compounds, such as chlorides and sulphates, can be used.

Two methods of forming patterns on glass are illustrated in the accompanying drawings and will be more fully described hereinafter. Briefly Fig. 1 diagrammatically illustrates a piece of glass with a metallic pattern on its surface, Fig. 2 shows the glass and pattern of Fig. 1 in a furnace where it is to be heated and subjected to an atmosphere containing sulfur trioxide, Fig. 3 shows the glass after the treatment illustrated in Fig. 2, Fig. 4 shows the glass with the visible pattern after a reduction treatment in the furnace, Fig. 5 is similar to Fig. 1, Fig. 6 shows the glass bearing the metallic pattern, prepared by coating with graphite for subsequent oxidation by electrolytic treatment, Fig. 7 illustrates the electrolytic treatment, Figs. 8 and 9 illustrate the effect of the electrolytic treatment, and Fig. 10 illustrates the final reduction step.

The original step of depositing the desired final pattern in metal or metallic compound on the surface of the glass can be effected by any suitable means. For example the glass may be coated with a film of a suitable metal or metallic compound and this film then coated with a film of photo-sensitive material such as photo-engraver's glue. The treated surface is then exposed to suitable light through a negative of the desired pattern which has been prepared by suitable means. The photo-sensitive material which has not been exposed to the light is removed by known means and the metal or metallic compound film underlying it is also removed by known means, thereby leaving the desired pattern in the metal or metallic compound on the surface of the glass. Alternatively the desired final pattern in metal or metallic compound may be deposited on the glass by other suitable means such as for example by evaporation of metal or metallic compound onto the glass through the pattern which has been previously formed in photo-engraver's glue, followed, if desired, by subsequent removal of photo-engraver's glue and metal or metallic compound not wanted in the final pattern.

By one particular method according to this invention the formation of the latent image in the glass is achieved by subjecting the glass with the metal or metallic compound thereon to heat in an atmosphere that is acidic and capable of causing oxidation. Such atmospheres can be obtained from a number of substances but the best and most convenient to use has been found to be one containing sulphur trioxide, $SO_3$, which is conveniently prepared by catalytic oxidation of the gas sulphur dioxide. Examples of other substances that have been used successfully are, chlorine, bromine, phosphoryl chloride, and sulphuryl chloride. Suitable atmospheres have been obtained by heating ferric sulphate, sulphuric acid, sodium bisulphate, and phosphorus pentoxide.

Good latent images have been obtained by heating the glass with the metal or metallic compound thereon in an atmosphere containing a low concentration of sulphur trioxide in air at temperatures as low as 200° C. and as high as 500° C. for periods ranging from 30 seconds to twenty minutes or even longer. To obtain the best results the temperature at which, and the time for which, the metal or metallic compound on the glass is exposed to the atmosphere containing the sulphur trioxide, have to be selected and they depend on the type of pattern and other factors such as type of glass, concentration of sulphur trioxide, type of metal or metallic compound, thickness of metal or metallic compound, and amount of lateral diffusion permissible.

After forming the latent image the glass is then exposed to a reducing atmosphere such as hydrogen or coal gas at about the same temperature. In this step the temperature range can be varied widely but the best results for our purposes have been obtained at 400° C. This step causes the latent scale or pattern to be developed within the glass.

The duration of the latter step in the process depends markedly upon the temperature and can be as short as two minutes with temperatures of the order of 500° C. but our best results have generally been obtained in from fifteen to twenty-five minutes at 400° C. The glass may be allowed to cool between the two heating stages and cleaned of any surplus material on the surface but this is not essential and the second heating step may directly follow the first. A plant for the continuous treatment of glasses may be set up by arranging for the glasses to travel slowly through a two-stage oven or furnace in which the required atmospheres are maintained in the two stages.

By a second particular method according to this invention the formation of the latent image in the glass is achieved by subjecting the glass with the metal or metallic compound thereon to a suitable alternating current or direct current potential. For example we have found that by making suitable contacts between the anode and cathode of a circuit with the faces of a glass disc kept at 400–500° C. and having on one face a pattern in metal or metallic compound and then applying a potential of 2000 volts D.C. for 15 seconds that with some metals such as silver and copper a latent image of the pattern is formed within the glass; with other metals such as gold a visible image is formed in the glass. At the same temperature but with varying times of treatment similar results have been obtained with other potentials such as 110 volts and 45 volts and even as low as 6 volts.

Just as in our first method temperature, time and other conditions have to be selected to give a desired result. So also in this second method the results obtained depend on temperature, time and potential used. For example at 300° C. a treatment for 30 minutes at 110 volts D.C. gave a good latent image for our purposes. When a latent image is formed it is capable of being converted into a visible image by reduction in hydrogen at an elevated temperature as already described or by another method to be described later.

In addition to the method already described for reducing latent images to visible images, this result can also be achieved by exposing a latent image to bombardment by electrons; the electrons may be obtained from any convenient source. For example, we have found that a latent image, formed from silver, when heated at about 500° C. and simultaneously bombarded with X-rays for 15 minutes was converted into a visible image without the necessity to use hydrogen gas. This method of converting the latent image to a visible image is applicable irrespective of the method used to form the latent image.

Unlike those produced by previously known methods the scales, patterns and the like produced by means of this invention are developed within the glass so that the pattern forming material is enclosed by, and is an integral part of the glass.

Structurally, glass consists of an irregular network of silica tetrahedra in which oxygen ions are present in two forms, namely, those linking two silicon ions and those not linking two silicon ions but which are associated with weak spots or "holes" in the network. Network modifying ions such as those of sodium, are situated in some of these interstices or "holes" and can migrate from one to another and can even leave the glass by way of the surface. These processes are assisted by a rise in temperature, by the presence of suitable agents in contact with the glass or by the application of a suitable potential.

Under suitable conditions ions of appropriate size and charge, such as those of silver and copper, can be made to migrate from the surface of the glass into the interstices or "holes" and so become part of the structure of the glass. This occurs in the first stage of our process in which also the removal of modifying ions is assisted by the presence of anionic and oxidising conditions at the surface of the glass or by the application of a suitable potential across the glass. In the second stage of our process the appropriate metallic ions, such as those of silver and copper which are now within the glass, are reduced to the atomic condition by the action of an electron donor such as hydrogen or directly by electron bombardment; the application of heat causes the atoms to aggregate and so form a visible pattern.

Graticules and other scales and patterns made by these processes are permanent in that they are resistant to abrasion, fungi, moisture, chemicals, steam or corrosive or deteriorating agents, nor do they need to be covered by a cover slip. Because the pattern is an integral part of the glass the question of adhesion of the pattern to the glass does not arise and the pattern is damaged only when the glass itself is damaged. It has been shown, for example, that such a pattern formed with silver, a metal which is normally attacked rapidly by concentrated nitric acid is unaffected by prolonged immersion in concentrated nitric acid. These scales and patterns can be made in a variety of colours, are pleasing in appearance and have none of the disadvantages of other types of scales and patterns. They have been made successfully using several different types of glass.

A further advantage of the invention is that it is not necessary to take great care to prevent development of defects in those areas surrounding the pattern, as is necessary in the case of most existing processes. The invention will thus enable graticules and the like to be produced more economically than hitherto and on a mass production scale.

The examples given below serve to illustrate the manner in which the invention may be applied. As we have previously indicated the desired initial pattern in metal or metallic compound may be formed on the surface of the glass by a number of methods, and when forming a graticule pattern in silver we have found that a single coat of silver deposited by the "Brashear" process gives satisfactory results for most purposes; under these conditions the thickness of the silver deposit would be approximately $0.1\mu$. The thickness of the deposit of metal or metallic compound may be varied to suit requirements. To provide a suitable atmosphere for the first stage of the process, when using our first method, we have found it convenient to use sulphur dioxide which is released from a cylinder into a stream of air (approximately 2% is sufficient).

After mixing and drying, the gases were passed through platinized quartz maintained at a temperature of 400–450° C., before entering the furnace where the first stage of the process takes place. The furnace consisted of an electrically heated silica tube and for convenience the catalyst was contained in a second tube within the furnace.

Example I

In preparing graticules by one variation of the process silver patterns were formed on plate glass using a photo-resist and ferric nitrate. The glass with the silver on it was then heated in a stream of air to 450° C. At this stage the supply of sulphur dioxide to the catalyst tube was turned on for 10 minutes, the temperature being maintained at 450° C.

The sulphur dioxide stream was then turned off and after about one minute the glass was withdrawn from the furnace, cleaned by wiping and reduced in hydrogen for 25 minutes at 400° C. This procedure is suitable for fairly coarse patterns and may be shortened by raising the reduction temperature if desired. By reducing the time for the first stage to 30 seconds, patterns of fine lines could be made but better results were obtained by the procedure given in the next example.

Example II

Glass coated with a silver pattern as in Example I was heated in the atmosphere containing sulphur trioxide for a period of 20 minutes at a temperature of 300° C. At the end of this time no metallic silver remained on the glass. The glass was wiped clean and was then heated in hydrogen at 400° C. for 25 minutes. Patterns of dense lines with sharp edges and 0.0005" wide resulted.

Example III

As an illustration of the effect of varying the temperature of reduction a number of patterns in silver were given the same initial treatment and then reduced at various temperatures from 150° C. to 470° C. It was found that at temperatures of 450° C., or above, reduction occurred within two minutes, or even less, but for fine patterns better results were obtained by heating at 400° C. for longer periods between 15 and 25 minutes. At still lower temperatures the time required for reduction is longer and may not be accompanied by satisfactory aggregation of the reduced metallic atoms.

Example IV

As an illustration of the use of a metallic compound to form the final pattern, a pattern was formed in glass by evaporation of silver chloride in vacuo. Application of the process for five minutes at 450° C. in the first stage and for twenty five minutes in the second stage resulted in the formation of permanent patterns within the glass. One pattern formed consisted of fine clear lines in a green transparent background.

Example V

As an illustration of the use of copper a pattern was formed in copper on Crystalex glass and application of the process as in Example IV resulted in the formation of a dark coppery red pattern within the glass.

Example VI

As a further illustration of the variety of types of lines that can be formed by this process some patterns of silver on barium light flint glass were prepared and processed as in Example IV. The lines forming the final pattern were very attractive in appearance; they consisted of a central transparent portion which was very light yellow in colour, surrounded by a very dark, well defined edge.

Example VII

Illustrating the application of the process to various types of glass, patterns of copper and silver were formed by evaporation onto borosilicate crown glass, barium flint glass, and dense lead flint glass. In another experiment a pattern was produced by etching a silver film deposited on "Pyrex" glass. In all cases application of the process resulted in the formation of permanent patterns within the glass; the patterns were of various colours including dark brown, light yellow brown, grey green and light coppery red.

Example VIII

Illustrating the application of the process for purposes other than the production of graticules, graduations in silver were formed on thermometer stems of a lead glass and a borosilicate glass. On further treating the glasses as in Example IV dense graduations were produced on both thermometer stems without visible effect on the body of the glass. The graduations were unaffected when boiled in 14 percent caustic potash or in concentrated hydrochloric acid and left standing in these solutions for many weeks.

Example IX

A potential of 50 volts A.C. was applied for 5 minutes across a disc of plate glass having on each side of it a pattern in silver and kept at approximately 450° C. Silver remaining on the surface of the glass was then removed by immersion in nitric acid.

The glass disc containing the latent images was then reduced in hydrogen gas thereby forming visible images of the original patterns within the glass.

We claim:

1. A method of producing a visible image of a pattern, scale or the like within glass which comprises the steps of, forming said pattern or scale as a corresponding coating on the surface of the glass, said coating being a substance of the group consisting of gold, silver and copper and their salts, subjecting said coating to oxidizing conditions at a temperature within the range of 200° to 500° centigrade to cause ions of the metal of said coating to penetrate into the glass, and subjecting said glass to reducing conditions at a temperature within the range of 200° to 500° centigrade.

2. A method of producing a visible image within glass as defined in claim 1 wherein the step of subjecting said coating to oxidizing conditions is constituted by exposing said coating to an acidic atmosphere.

3. A method of producing a visible image within glass as defined by claim 2 wherein said acidic atmosphere contains sulphur trioxide.

4. A method of producing a visible image within glass as defined by claim 1 wherein the step of subjecting said coating to oxidizing conditions is constituted by application of an electric potential to the coated surface of the glass at a temperature within the range of from 300° to 500° centigrade.

5. A method of producing a visible image within glass as defined by claim 1 wherein the step of subjecting said glass to reducing conditions is constituted by exposing the same to a reducing atmosphere containing hydrogen.

6. A method of producing a visible image within glass as defined by claim 5 wherein said reducing atmosphere is maintained at a temperature of about 400° centigrade for a period of from 15 to 25 minutes.

7. A method of producing a visible image within glass as defined by claim 1 wherein the step of subjecting said glass to reducing conditions is constituted by bombardment of the same with electrons.

8. A method of producing a visible image within glass as defined by claim 7 wherein said electron bombardment is effected at a temperature of about 500° centigrade for a period of about 15 minutes.

9. A method as defined in claim 1 in which the substance is silver.

10. A method as defined in claim 1 in which the substance is copper.

11. A method of producing a visible image of a pattern such as a scale or the like within glass which comprises the steps of, forming said pattern or scale as a corresponding coating of metallic gold on the surface of the glass, and exposing said coated surface to oxidizing conditions by application of an electrical potential thereto at a temperature within the range of 400° to 500° centigrade to cause said gold to penetrate into the glass and establish a visible image therein corresponding to said coating.

References Cited in the file of this patent

UNITED STATES PATENTS

| | | |
|---|---|---|
| 2,035,015 | Schirmer | Mar. 24, 1936 |
| 2,075,446 | Leibig | Mar. 30, 1937 |
| 2,422,472 | Dalton | June 17, 1947 |
| 2,424,043 | Meyer | July 15, 1947 |
| 2,660,091 | McCallum | Nov. 24, 1953 |